United States Patent [19]

Kato et al.

[11] 4,368,297

[45] Jan. 11, 1983

[54] PAINT CONTAINING A SILYL GROUP CONTAINING VINYL RESIN, AND A METHOD OF MANUFACTURING THE SAME WITH ETHYL SILICATE AND CURING CATALYST

[75] Inventors: Yasushi Kato; Hisao Furukawa; Naotami Ando, all of Kobe, Japan

[73] Assignee: Kanegafuchi Kagaku Kogyo Kabushiki Kaisha, Osaka, Japan

[21] Appl. No.: 278,183

[22] Filed: Jun. 29, 1981

[30] Foreign Application Priority Data

Jul. 11, 1980 [JP] Japan ................................ 55-95481

[51] Int. Cl.³ ........................ C08F 8/42; C09D 3/72
[52] U.S. Cl. .................................. 525/342; 525/100; 525/101; 525/102
[58] Field of Search ................ 525/100, 101, 102, 342

[56] References Cited

U.S. PATENT DOCUMENTS 3,681,287 8/1972 Brown et al. ...................... 525/342
4,243,767 1/1981 Kaufman ............................ 525/342

FOREIGN PATENT DOCUMENTS 2006222 5/1979 United Kingdom .

*Primary Examiner*—A. Lionel Clingman
*Attorney, Agent, or Firm*—Moonray Kojima

[57] ABSTRACT

A paint comprising a silyl group containing vinyl resin having a main chain comprising substantially vinyl polymer and copolymerized with maleic anhydride, wherein the resin has at least one silyl group bonded to a hydrolyzable group, and contains 0.1 to 20% by weight of the copolymerized maleic anhydride. The resin has a molecular weight of 300 to 30,000. A method of manufacturing such a resin is disclosed.

5 Claims, No Drawings

PAINT CONTAINING A SILYL GROUP CONTAINING VINYL RESIN, AND A METHOD OF MANUFACTURING THE SAME WITH ETHYL SILICATE AND CURING CATALYST

BACKGROUND OF THE INVENTION

1. Field of the Invention

This invention relates to a paint containing a vinyl resin, and a method of manufacturing the same.

2. Description of the Prior Art

A vinyl resin containing a silyl group having a hydrolyzable group at its terminal or in its side chain, has many outstanding advantages. The hydrolyzable silyl group improves adhesion of the resin to an inorganic material. Moreover, it accomplishes cross-linking at room temperature, with the aid of water, particularly in ambient air, and forms a dense network structure which provides the resin with an outstanding degree of solvent resistance, water resistance, heat resistance, hardness, surface luster and weather resistance. All of these advantages have been priorly disclosed, for example in Japanese Patent Application Laid-Open No. 36395/79.

Such a vinyl resin has, however, been still unsatisfactory in a number of other respects. For example, although it is highly adhesive to an inorganic material, as in the case wherein a silane coupling agent is used, it does not show any satisfactory adhesion to an organic material. Also, the synthesis of a vinyl resin containing a silyl group tends to lack stability or reliability, since it is likely to increase in viscosity or form a gel during its synthesis.

In order to obtain such a vinyl resin having improved physical properties, it has been proposed to copolymerize an organic acid, such as acrylic or methacrylic acid. The use of an organic acid has, however, been found to give rise to a serious problem in the synthesis of such a resin. A silyl group containing vinyl resin may be synthesized by either of the following methods, for example:

(A) reaction between a vinyl resin having a carbon-carbon double bond and a hydrosilane, and (B) copolymerization between a vinyl compound and a silyl compound having a polymerizable double bond.

If an organic acid, such as acrylic acid, is used for copolymerization, there is likely to result, a high degree of increase in viscosity and gelation. This tendency increases with increase in the number of hydrolyzable groups bonded to silicon. This is apparently due to the high acidity of an organic acid, and thus, its heavy catalytic action for the reactions in above methods (A) and (B).

Moreover, a silyl group containing compound lacks storage stability. Due to the reactivity of its silyl group, a silyl group containing compound is used for a wide range of applications, including the preparation of paints, coating agents, silane coupling agents and adhesives. Such a compound is, however, likely to increase in its viscosity and ultimately form a gel, as a result of the reaction of its silyl group during storage. In order to improve the storage stability of such a compound, the inventors have found it considerably effective to incorporate an alcohol and hydrolyzable ester compound, such as disclosed in Japanese patent application laid-open Nos. 25728/79 and 121181/79. The problem of storage stability is particularly serious when a silyl group containing vinyl resin is used for a paint containing a large quantity of a pigment, such as titanium dioxide. The moisture which the pigment contains seriously affects the storage stability of the paint, and is likely to cause an increase in its viscosity and its gelation.

The silyl group of a silyl group containing vinyl resin is represented by the formula:

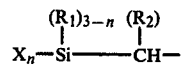

wherein X represents a hydrolyzable group, ($R_1$) and ($R_2$) each represents a hydrogen atom, or an alkyl, aryl or aralkyl group having 1 to 10 carbon atoms, and n is 1, 2, or 3. It differs in various respects from a silicon modified vinyl resin obtained by for example, the condensation of a compound of the formula:

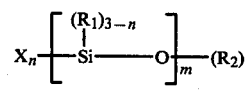

wherein m represents an integer, and a compound having a group represented as

and represented by the formula:

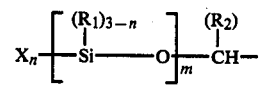

A silyl group containing vinyl resin is curable at room temperature, or at a temperature which is not higher than 80° C., while a silicon-modified vinyl resin must be heated to a temperature of at least 100° C. for curing. The —Si—C— linkage produced by curing of the former resin is far more stable that the —Si—O—C— linkage produced by curing of the latter resin, against not only acid, but also against water and alkali. Thus, the former resin also has an improved degree of water alkali resistance.

SUMMARY OF THE INVENTION

By incorporating maleic anhydride into a silyl group containing vinyl resin, it was discovered that the physical properties were unexpectedly and outstandingly improved, and that there accrued many advantages in the process of its synthesis. It was discovered that the use of maleic anhydride unexpectedly contributes to improving the storage stability of the resin, to an outstanding degree. For example, use of maleic acid improves adhesion of the resin to an organic material, as well as to an inorganic material. Thus, the vinyl resin of this invention is usable as an application on both inorganic and organic surfaces, in the form, for example, of paints, coatings, adhesives, etc. And in addition, the storage stability is unexpectedly improved. Thus, when used for paints for example, with dispersion of pigments therein, the invention improves stability of the paint, and increases the pot life of the paint in open air, both of considerable importance commercially.

Thus, this invention encompasses a vinyl resin having maleic anhydride copolymerized therein, utilizable as a component in paints wherein the vinyl resin comprises a main chain comprising substantially vinyl polymer, and has a molecular weight of 300 to 30000, and preferably 1,000 to 30,000, the resin having in one molecule at least one silyl group bonded to a hydrolyzable group, and contains 0.1 to 20% by weight of the copolymerized maleic anhydride. Each sily group preferably has a molecular weight of 300 to 4,000.

These and other features, objects and advantages of this invention will become more apparent from the following detailed description.

DETAILED DESCRIPTION OF PREFERRED EMBODIMENTS

The silyl group containing vinyl resin of this invention has in each molecule at least one, and preferably at least two, silyl groups bonded to a hydrolyzable group, and contains 0.1 to 20% by weight of maleic anhydride as a compolymer component. The silyl groups are represented by the formula:

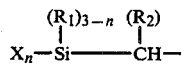

wherein X represents a hydrolyzable group, $(R_1)$ and $(R_2)$ each represents a hydrogen atom or an alkyl, aryl or aralkyl group having 1 to 10 carbon atoms, and n is an integer of 1, 2 or 3. The hydrolyzable group may, for example, be a halogen, alkoxy, acyloxy, ketoximato, amino, acid amide, aminoxy, mercapto or alkenyloxy group.

The vinyl resin of this invention may be manufactured by a variety of methods, but it is industrially beneficial and preferable to manufacture it by either of the following methods:

(A) By hydrosilylation reaction between a vinyl resin having a carbon-carbon double bond and hydrosilane; or (B) By copolymerization between a vinyl compound and a silyl compound having a polymerizable double bond. Each of these methods (A) and (B) will hereinafter be described in greater detail.

In the first method (A), the silyl group containing vinyl resin of this invention, can be easily manufactured by reacting a hydrosilane compound of the formula:

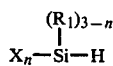

with a vinyl resin having a carbon-carbon double bond, in the presence of a catalyst comprising a transition metal belonging to Group VIII of the Periodic Chart. In the above formula, $(R_1)$ represents a hydrogen atom or a monovalent hydrocarbon group selected from among alkyl, aryl and aralkyl groups having 1 to 10 carbon atoms; X represents a hydrolyzable group; and n is an integer of 1, 2 or 3.

Specific examples of the hydrosilane, represented by the above formula, include silane halides, such as, methyldichlorosilane, trichlorosilane and phenyldichlorosilane; alkoxysilanes, such as, methyldiethoxysilane, methyldimethoxysilane, phenyldimethoxysilane, trimethoxysilane and triethoxysilane; acyloxysilanes, such as, methyldiacetoxysilane, phenyldiacetoxysilane and triacetoxysilane; and other types of silanes, such as methyldiaminoxysilane, triaminoxysilane, methyldiaminosilane, triaminosilane, bis(dimethylketoxymate)methylsilane, bis(cyclohexylketoxymate)methylsilane, methyldiisopropenoxysilane and triisopropenoxysilane.

Although there is no particular limitation to the quantity of a hydrosilane compound to be used, it is preferable to employ 0.5 to 2.0 mols thereof per mol of the vinyl resin, depending on the carbon-carbon double bond contained in the latter. If any more hydrosilane is employed, it is recoverable in an unreacted state.

According to this invention, it is advantageously possible to use an inexpensive, highly reactive silane halide. Although a silyl group containing vinyl resin, prepared from a silane halide, is rapidly curable at room temperature, upon exposure to ambient air, it generates hydrogen chloride. The irritating odor and corrosive nature of hydrogen chloride restricts the scope of its application. Thus, it is desirable to convert the functional halogen group to another hydrolyzable functional group, such as, alkoxy, acyloxy, aminoxy, amino, acid amide, ketoximato or mercapto, by a method which is, for example, described in Japanese patent application laid-open No. 91546/79.

As regards the vinyl resin to be reacted with a hydrosilane compound, it is possible to use any vinyl resin, without any particular limitation, provided it contains copolymerized maleic anhydride. It is, therefore, suitable to use a resin composed mainly of an acrylic or methacrylic ester, such as methyl acrylate, methyl methacrylate, butyl acrylate or butyl methacrylate; a monomer containing an acid amide group, such as, acrylamide, methacrylamide, N-butoxymethylacrylamide, N-butoxymethylmethacrylamide; an epoxy group, such as, glycidyl acrylate or glycidyl methacrylate; or an amino group, such as diethylaminoethyl acrylate, diethylaminoethyl methacrylate or aminoethylvinyl ether; or a copolymer, such as, acrylonitrile, iminol methacrylate, styrene, alpha-methylstyrene, alkylvinyl ether, vinyl chloride, vinyl acetate, vinyl propionate or ethylene.

The carbon-carbon double bond, which is required for the hydrosilylation reaction, can be introduced into vinyl resin when a vinyl homopolymer or copolymer is partially radically copolymerized with allyl acrylate, allyl methacrylate, diallyl phthalate, or the like. The quantity of monomer required for that purpose may be selected appropriately to suit the number of silyl groups to be formed, but it is preferable that each silyl group have a molecular weight of 300 to 4,000. A silyl group containing vinyl resin having a molecular weight of 1000 to 30,000 can be obtained when a chain transfer agent, e.g. n-dodecyl mercaptan or t-dodecyl mercaptan, is added as required, or if the quantity of catalyst and reaction temperature, are appropriately adjusted. A solvent may (but not necessarily) be used for polymerization of those vinyl compounds. If any solvent is present, it is desirable to use an unreactive solvent, such as ethers, hydrocarbons or acetic esters.

The molecular weight of a substance is a physical property which can be measured in a number of ways, for example, by the G.P.C. method (Gel Permeation Column Method), or the Vapor Pressure Osmometry Method. The results obtained would be substantially the same regardless of which method is used. The Vapor Pressure Osmometry method is preferred, and was used in examples.

The silyl group containing vinyl resin of this invention may contain 0.1 to 20% by weight, and preferably 0.5 to 10% by weight, of maleic anhydride.

A catalyst, comprising a transition metal complex is required for the reaction of hydrosilane compound with the carbon-carbon double bond. It is effective to use as a catalyst, a complex compound of a Group VIII transition metal such as platinum, rhodium, cobalt, palladium or nickel. The hydrosilylation reaction may be accomplished at any temperature in the range of 50° C. to 150° C., and for a period of 1 to 10 hours.

In the Second Method (B), alternately, the silane group containing vinyl resin of this invention may be manufactured by radical polymerization of a vinyl compound with a silane compound having the formula:

$$(R_2)-\underset{\underset{X_n}{|}}{\overset{\overset{(R_1)_{3-n}}{|}}{Si}}-X_n$$

where ($R_1$) represents hydrogen atom or a monovalent hydrocarbon group selected from among alkyl, aryl and aralkyl groups having 1 to 10 carbon atoms, ($R_2$) represents an organic residue having a polymerizable double bond, X represents a hydrolyzable group, and n is an integer of 1, 2 or 3.

Examples of the silane compound include the following:

$CH_2=CH.Si(OCH_3)_2$,  $CH_2=CHSiCl_2$ $CH_2=CHSi(OCH_3)_2$   $CH_2=CHSiCl_3$ $CH_2=CHCOO(CH_2)_3\underset{\underset{}{|}}{\overset{\overset{CH_3}{|}}{Si}}(OCH_3)_2$, $CH_2=CHCOO(CH_2)_3Si(OCH_3)_3$ $CH_2=CHCOO(CH_2)_3\underset{\underset{}{|}}{\overset{\overset{CH_3}{|}}{Si}}Cl_2$,  $CH_2=CHCOO(CH_2)_3SiCl_3$ $CH_2=C(CH_3)COO(CH_2)_3\underset{\underset{}{|}}{\overset{\overset{CH_3}{|}}{Si}}(OCH_3)_2$, $CH_2=C(CH_3)COO(CH_2)_3Si(OCH_3)_3$ $CH_2=C(CH_3)COO(CH_2)_3\underset{\underset{}{|}}{\overset{\overset{CH_3}{|}}{Si}}Cl_2$,  $CH_2=C(CH_3)COO(CH_2)_3SiCl_2$

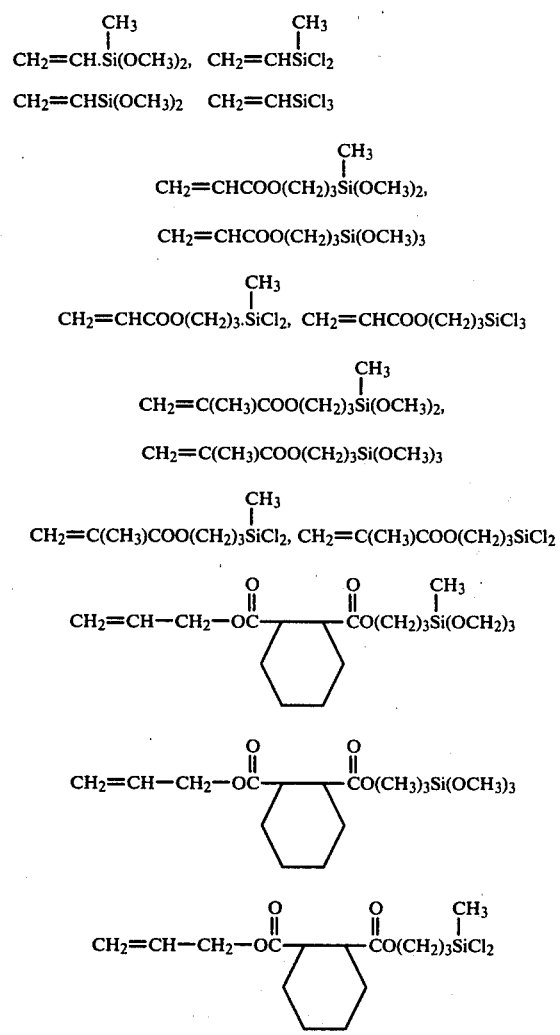

These silane compounds can be synthesized by various methods, for example, by reacting acetylene, allyl acrylate, allyl methacrylate or diallyl phthalate, with methyldimethoxysilane, methyldichlorosilane, trimethoxysilane or trichlorosilane, in the presence of a Group VIII transition metal catalyst.

The quantity of the saline compound to be used may be selected so that each silyl group has a molecular weight of 300 to 4,000.

The vinyl compound to be compolymerized with the silane compound must be selected from among those which can be used for synthesizing a vinyl resin by the method (A) described above. In addition, it is also possible to use a vinyl compound having a hydroxyl group, for example, 2-hydroxyethyl acrylate, 2-hydroxyethyl methacrylate, 2-hydroxypropyl acrylate, 2-hydroxypropyl methacrylate, 2-hydroxyvinyl ether, N-methylolacrylamide, or Aronix 5700 (a product of Toa Gosei Kagaku Kogyo K. K.)

The copolymerization between the vinyl and silane compounds may be synthesized by a customary method of solution polymerization. The vinyl and silane compounds are reacted with each other at a temperature of 50° C. to 150° C., in the presence of a radical polymerization initiator. A chain transfer agent, such as n-dodecyl mercaptan or t-dodecyl mercaptan, may be added if needed for obtaining a silyl group containing copolymer having a molecular weight of 1,000 to 30,000. The molecular weight of the copolymer may also be varied by adjusting appropriately the quantity of catalyst used and the reaction temperature used. A solvent may (but not necessarily) be used. If any solvent is used, it is desirable to use a non-reactive solvent, such as ethers, hydrocarbons, or acetic esters.

The hydrolyzable group in the silyl group containing vinyl resin obtained by the above method (B) can be changed as hereinbefore described in connection with the above method (A).

The silyl group containing vinyl resin of this invention is curable at room temperature upon exposure to ambient air, which contains moisture, thereby forming chemically, a net work structure. Its curing speed depends upon the temperature and relative humidity of the air to which it is exposed, and the hydrolyzable group contained therein. Thus, it is particularly important to remember that the type of hydrolyzable group should be taken into consideration when the resin is used.

A curing promotor may (but not necessarily) be used for curing the vinyl resin of this invention. If any curing promotor is used, it is effective to use a metal salt of a carboxylic acid, such as, alkyltitanate, tin octylate or dibutyl tin dilaurate; a metal salt of a sulfide or mercaptide, such as, $(n-C_4H_9)_2Sn=S$, $(n-C_8H_{17})_2Sn=S$, $(n-C_4H_9)_2Sn(SCH_2COOC_8H_{17}\text{-iso})_2$, $(n-C_8H_{17})Sn(SCH_2COO(CH_2)_4OCOCH_2S)$; an amine, such as dibutylamine-2-hexoate; or any other acid or basic catalyst. The quantity of curing promotor to be used is preferably in the range of 0.001% to 10% by weight based on the resin weight.

The silyl group containing vinyl resin is useful as a paint or a coating material, since it is curable at room temperature or at a low temperature. In fact, advantageously, it is rapidly curable at room temperature to form a coated film having a highly lustrous surface as will hereinafter be shown by the Examples. The surface hardness or other physical properties of the coated film of the invention can be further improved if ethyl silicate, or any other compound that is capable of co-condensation with the vinyl resin of this invention, is incorporated therein. The vinyl resin of this invention may be blended appropriately into various kinds of conventionally available resinous paints and coating materials, such as, resinous lacquers, acrylic lacquers, thermosetting acrylic paints, alkyl resin paints, melamine resin paints or epoxy resin paints, to thereby advantageously improve the adhesion, weather resistance and other physical properties thereof.

It is possible to mix the vinyl resin of this invention with various kinds of fillers and pigments, such as, silica, calcium carbonate, magnesium carbonate, titanium dioxide, iron oxide, glass fibers, inorganic pigments or organic pigments. Thus, the silyl group containing vinyl resin of this invention of useful as a surface treating agent for various kinds of inorganic and organic materials. It may be used as a painting, coating or sealing composition for aircrafts, buildings, automobiles, glass and the like, in addition to the variety of uses set forth above.

The invention will now be described more specifically with reference to actual examples, which examples are to be construed to be illustrative of the invention and are not in any way to be construed to be limiting of the invention.

EXAMPLE 1

A solution containing 2 g of azobisisobutyronitrile dissolved in 30 g of styrene, 16 g of allyl methacrylate, 20 g of methyl methacrylate, 19 g of n-butyl methacrylate, 14 g of butyl acrylate, 2 g of maleic anhydride, 4 g of acrylamide, 2 g of n-dodecyl mercaptan and 10 g of n-butanol, was poured into 90 g of xylene heated to 90° C. and reacted for 10 hours, whereby an unsaturated allyl group containing vinyl polymer was observed. The infrared absorption spectrum of this polymer indicated absorption by a carbon-carbon double bond at 1648 cm$^{-1}$ and by acid anhydride at 1780 cm$^{-1}$.

Under reduced pressure, 40 g of the solvent and a major part of n-butanol were removed from the polymer solution. As isopropanol solution containing 1.5 g of methyldimethoxysilane and 0.0005 g of chloroplatinic acid was added into 16 g of the unsaturated allyl group containing vinyl copolymer solution. The mixture was reacted at 90° C. for 6 hours in a tightly closed reactor.

The reaction product was a silyl group containing vinyl polymer showing no absorption at 1648 cm$^{-1}$ on its infrared absorption spectrum.

COMPARATIVE EXAMPLE 1

The procedures of Example 1 were repeated for synthesizing a silyl group containing vinyl polymer, except that no maleic anhydride was employed.

EXAMPLE 2

A solution containing 2 g of azobisisobutyronitrile dissolved in 30 g of styrene, 29 g of methyl methacrylate, 11 g of allyl methacrylate, 28 g of butyl acrylate, 2 g of maleic anhydride and 2 g of n-dodecyl mercaptan, was poured into 150 g of n-butyl acetate (a solvent) heated to 90° C. and reacted for 10 hours, whereby an unsaturated allyl group containing acrylic polymer having a molecular weight of 8,000 was obtained.

An isopropanol solution containing 2.4 g of trichlorosilane and 0.0008 g of chloroplatinic acid was added into 25 g of the allyl type acrylic polymer. The mixture was reacted at 90° C. for 6 hours in a tightly closed reactor. After reaction had been completed, 5 ml of methanol and 5 ml of methyl orthoformate were added into the solution, and the solution was stirred until its pH value reached 7, whereby a silyl group containing vinyl polymer was obtained.

EXAMPLES 3 AND 4

The procedures of Example 1, were repeated for preparing a silyl group containing vinyl polymer, except that 14 g of allyl acrylate (Ex. 3) and 31 g of diallyl phthalate (Ex. 4) were used instead of 16 g of allyl methacrylate.

EXAMPLE 5

Ethyl silicate was added into the silyl group containing vinyl polymer obtained in Example 1, to form a solution containing 20 parts of ethyl silicate based on the weight of the solid content of the polymer.

EXAMPLE 6

A solution containing 2 g of azobisisobutyronitrile dissolved in 30 g of styrene, 22 g of $CH_2=C(CH_3)COO(CH_2)_3Si(OCH_3)_3$, 22 g of methyl methacrylate, 15 g of n-butyl methacrylate, 18 g of butyl acrylate, 4 g of maleic anhydride and 4 g of n-dodecyl mercaptan, was poured into 100 g of xylene heated to 90° C. in a tightly closed reactor and reacted for 10 hours, whereby a silyl group containing vinyl polymer having a molecular weight of 6,000 was obtained. The infrared absorption spectrum of this polymer indicated absorption by acid anhydride at 1780 cm$^{-1}$.

EXAMPLE 7

A solution containing 5 g of azobisisobutyronitrile dissolved in 15 g of styrene, 15 g of $CH_2=C(CH_3)COO(CH_2)_3Si(OCH_3)_3$, 55 g of methylmethacrylate, 20 g of butylacrylate and 1 g of maleic anhydride was poured into a mixture of 50 g of butylacetate and 50 g of xylene heated to 120° C. in a tightly closed reactor, and reacted for 10 hours, whereby a silyl group containing vinyl polymer having a molecular weight of 8,000 was obtained. The infrared absorption spectrum of this polymer indicated absorption by acid anhydride at 1780 cm$^{-1}$. Then, 150 g of methanol was added to the reaction mixture and heated at 50° C. for one hour. The infrared absorption spectrum of the polymer reacted with methanol disappeared at absorption of 1780 cm$^{-1}$.

COMPARATIVE EXAMPLE 2

The procedures of Example 6 were repeated for preparing a silyl group containing vinyl polymer, except that no maleic anhydride was used.

COMPARATIVE EXAMPLE 3

Attempt was made to obtain a vinyl polymer by using acrylic acid instead of maleic anhydride and otherwise repeating the procedures of Example 6. However, a heavy increase in viscosity compelled the reaction to be discontinued at the end of 7 hours.

Titanium dioxide was mixed by a ball mill into each of the polymer solutions obtained in Examples 1 through 7 and Comparative Examples 1 to 2 in a mixing ratio of 1:1 by solid weight, whereby a white enamel paint was prepared. A catalyst was added into each enamel as shown in Table 1, and it was overcoated on a coated film of a nitrocellulose lacquer surfacer, on a mild steel plate, or was simply coated on a mild steel plate. The coating was heated at 60° C. for 40 minutes, and after one day, its solvent resistance and surface hardness were examined. Moreover, a film of each polymer solution, into which a catalyst has been added, was formed by casting and heat treating at 60° C. for 40 minutes. After one day, the film was checked for its acetone-insoluble gel content. The results are shown in Table 1.

Moreover, 5 parts of methanol, 1.5 parts of methyl orthoformate and xylene were added into each white enamel based on the solid weight thereof to form an enamel paint having a solid content of 65% by weight. Herein the term "parts" is in respect to weight, unless otherwise indicated. Each enamel paint was checked for storage stability at 50° C. for one month, and its change in viscosity was examined. The results are shown in Table 1.

As is clear from the Table appearing hereinafter, the incorporation of maleic anhydride by copolymerization unexpectedly contributes to improving the curability of the resin to an outstanding degree, as shown by the gel content, hardness and the results of the spot tests. It should be noted that from the results of the spot tests, the products of this invention showed greatly improved and unexpectedly good adhesion to both organic and inorganic materials, such as organic lacquer surfacer and mild steel plate, respectively. Maleic anhydride was shown to unexpectedly improve the storage stability of the point to an outstanding degree.

The terms "vinyl resin," "vinyl polymer" and "vinyl copolymer" have been used interchangeably herein, without any distinction being intended in each use. The meanings should be clear from the context. In the strict sense, however, they are vinyl copolymers, unless indicated otherwise by the context of usage, that is a vinyl monomer having copolymerized therewith other copolymerizable components, such as maleic anhydride, silane containing component, etc.

TABLE 1

(PART 1)

|  | Base | Catalyst | Spot test for Solvent Resistance | |
|---|---|---|---|---|
|  |  |  | Toluene | Lacquer Thinner |
| Example 1 | Mild Steel Plate | Q610 | O | O |
| Example 1 | Lacquer Surfacer | Q610 | O | Δ |
| Comp. Ex. 1 | Mild Steel Plate | Q610 | X | X |
| Comp. Ex. 1 | Lacquer Surfacer | Q610 | X | X |
| Example 2 | Mild Steel Plate | Q610 | O | O |
| Example 2 | Lacquer Surfacer | OTL | O | Δ |
| Example 3 | Mild Steel Plate | OTL | O | O |
| Example 4 | Mild Steel Plate | OTL | O | O |
| Example 5 | Mild Steel Plate | OTL | O | O |
| Example 6 | Mild Steel Plate | Stann JF-9B | O | O |
| Example 6 | Lacquer Surfacer | Stann JF-9B | O | O |
| Example 7 | Lacquer Surfacer | OTL | O | O |
| Comp. Ex. 2 | Mild Steel Plate | OTL | O | X |
| Comp. Ex. 2 | Lacquer Surfacer | OTL | Δ | X |

(PART 2)

|  | Pencil Hardness | Gel Content (%) | Storage Stability at 50° C. | | Potlife at room temp. in open air (hours) |
|---|---|---|---|---|---|
|  |  |  | Initial Viscosity (cps) | Viscosity after 1 months (cps) |  |
| Example 1 | F | 78 |  |  | More than 24 |
| Example 1 | HB |  |  |  |  |
| Comp. Ex. 1 | 2B | 70 |  |  | 12 |
| Comp. Ex. 1 | 2B |  |  |  |  |
| Example 2 | F | 80 |  |  | more than 24 |
| Example 2 | HB |  |  |  |  |
| Example 3 | F | 85 |  |  | more than 24 |
| Example 4 | F | 80 |  |  | more than 24 |
| Example 5 | H | 78 |  |  | more than 24 |
| Example 6 | F | 84 | 150 | 350 | more than 24 |
| Example 6 | HB |  |  |  |  |
| Example 7 | H | 87 |  |  | more than 24 |
| Comp. Ex. 2 | B | 75 | 150 | 2,000 | 3 |
| Comp. Ex. 2 | 2B |  |  |  |  |

NOTES TO TABLE 1:
Spot Test: A single drop of toluene or a lacquer thinner was cast on a coated film surface, and the film was examined for any changes
O = Film did not show any changes.
Δ = Film showed slight changes.
X = Film was swollen, or peeled off the base.
Pencil Hardness Test: Determined in accordance with pencil scratch test K 5400 of the Japanese Industrial Standard. (JIS)
Catalyst used: Q610 = Epoxy resin curing agent of mitsui Petrochemical Epoxy Co, Ltd.
DTL = Dibutyl Tin Dilaurate
Stann JF-9B = Organo tin salt of mercaptide (manufactured by Sankyo Yuki Gosei Co, Ltd)
OTL = Dioctyl tin dilaurate.
Quantity of Catalyst Added = 3% by weight based on solid content of resin being 100% by weight.

The foregoing description is illustrative of the principles of the invention. Numerous modifications and extensions thereof would be apparent to the worker skilled in the art. All such modifications and extensions are to be considered to be within the spirit and scope of this invention.

What is claimed is:

1. A paint comprising a mixture of ethyl silicate; a catalyst of a metal salt of a carboxylic acid; and a silyl group containing vinyl resin having a main chain comprising substantially vinyl polymer, said resin having in each molecule at least one silyl group bonded to a hydrolyzable group, said resin containing 0.1 to 20% by weight of maleic anhydride by copolymerization, and having a molecular weight of 1,000 to 30,000, wherein said sily group is represented by the formula $$X_n-\underset{\underset{Si}{|}}{\overset{(R_1)_{3-n}}{|}}-\underset{\underset{CH-}{|}}{\overset{(R_2)}{|}}$$

wherein X represents said hydrolyzable group, (R$_1$) and (R$_2$) each represents a hydrogen atom, or an alkyl, aryl or aralkyl group having 1 to 10 carbon atoms, and n is an integer of 1,2 or 3.

2. A method of manufacturing a paint comprising the steps of producing a silyl group containing vinyl resin having a molecular weight of 300 to 30,000 by copolymerizing a vinyl resin having 0.1 to 20% by weight of maleic anhydride, wherein said vinyl resin has a carbon-carbon double bond at its terminal or in its side chain with a hydrosilane compound of the general formula:

$$X_n-\underset{\underset{Si}{|}}{\overset{(R_1)_{3-n}}{|}}-H$$

wherein (R$_1$) represents a hydrogen atom or a monovalent hydrocarbon group selected from the group consisting of alkyl, aryl and aralkyl groups, and having 1 to 10 carbon atoms, X represents a hydrolyzable group, and n is an integer of 1, 2 or 3; said copolymerization taking place at a temperature of from 50° C. to 150° C. and in the presence of a polymerization catalyst selected from the group consisting of transition metals belonging to Group VIII of the Periodic Table and complex compounds thereof; adding ethyl silicate to said silyl group containing vinyl resin; and mixing a hardening promotor of a metal salt of carboxylic acid with the resulting mixture.

3. A method of manufacturing a paint, comprising the steps of producing a silyl group containing vinyl resin having a molecular weight of 300 to 30,000 by radical polymerizing a vinyl compound with a silane compound of the general formula:

$$(R_2)-\underset{\underset{Si}{|}}{\overset{(R_1)_{3-n}}{|}}-X_n$$

wherein (R$_1$) represents a hydrogen atom or a monovalent hydrocarbon group selected from the group consisting of alkyl, aryl and aralkyl groups, and having 1 to 10 carbon atoms, (R$_2$) represents an organic residue having a polymerizable double bonds, X represents a hydrolyzable group, and n is an integer of 1, 2 or 3; and with 0.1 to 20% by weight of maleic anhydride; adding ethyl silicate to said silyl group containing vinyl resin; and mixing a catalyst of a metal salt of carboxylic acid with the resulting mixture.

4. The paint of claim 1, wherein said molecule has a molecular weight of 300 to 4,000 per silyl group.

5. The paint of claim 1, wherein said hydrolyzable group is a methoxy group.

* * * * *